ns PATENT OFFICE.

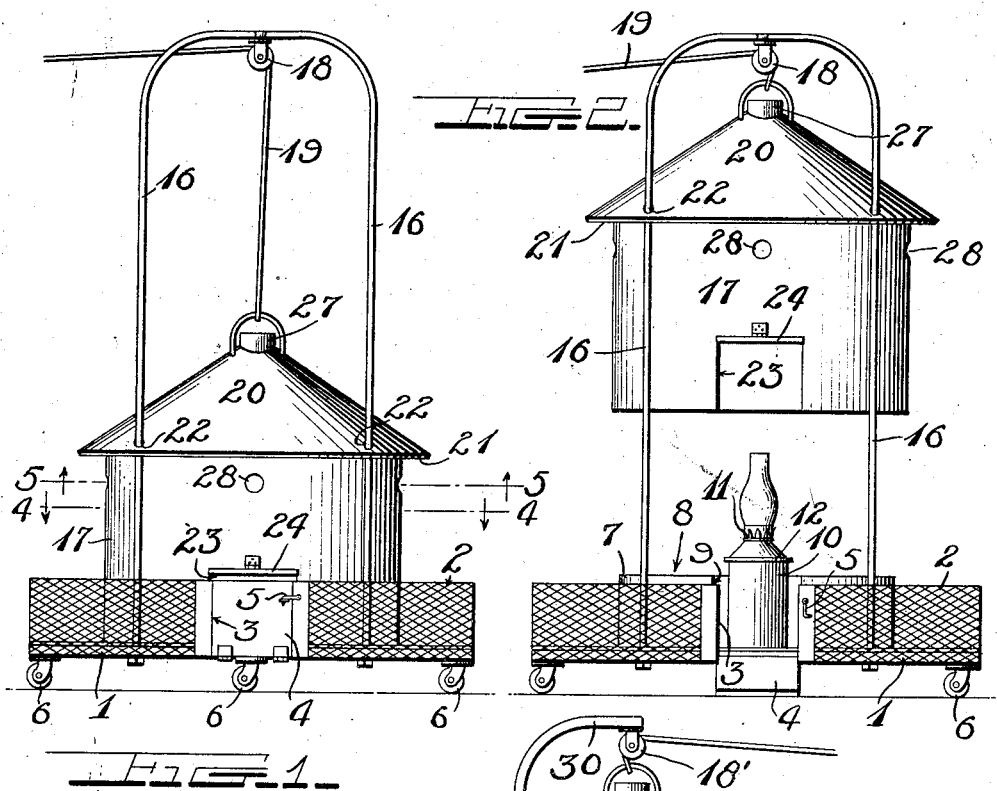

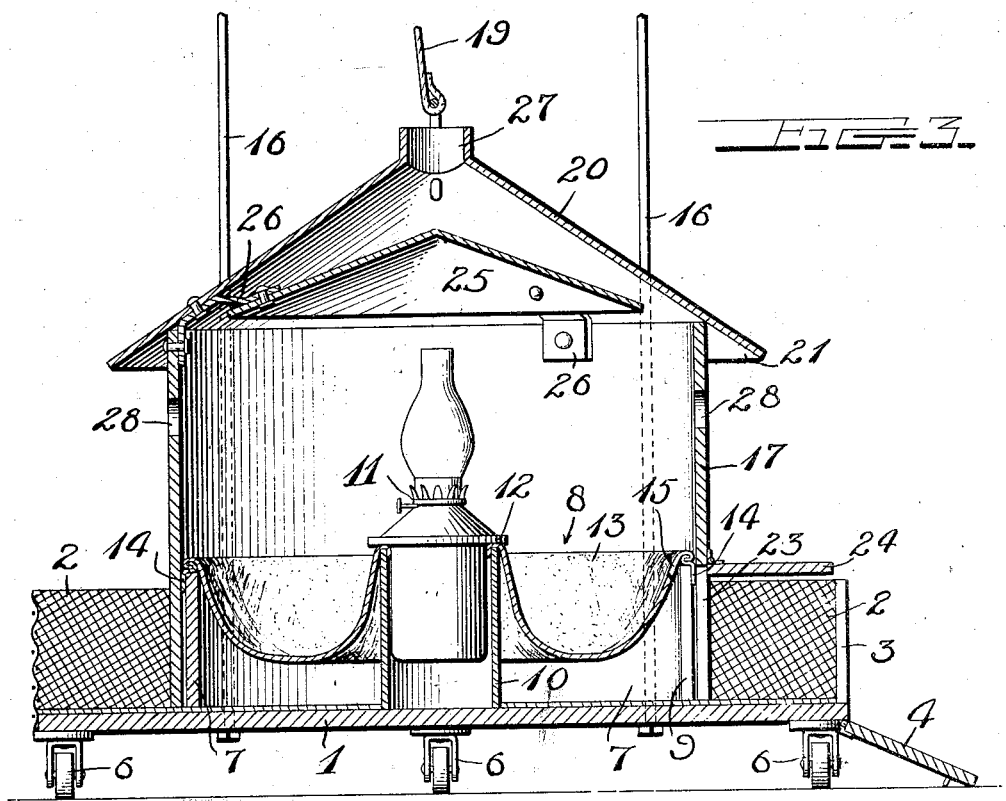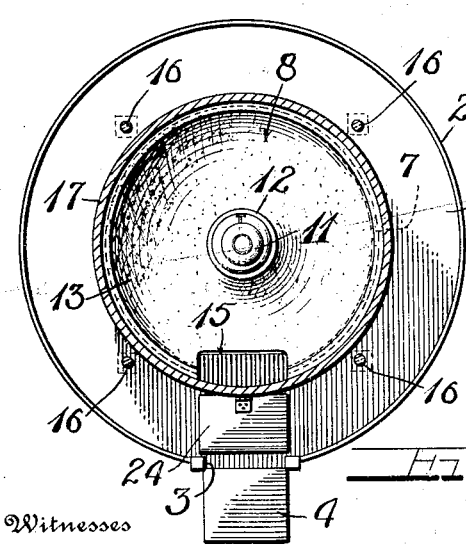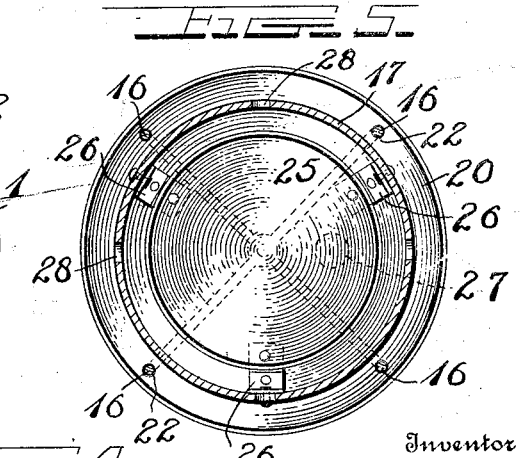

PEARL DANIELL, OF LAWTON, OKLAHOMA.

BROODER.

1,154,488.

Specification of Letters Patent.  Patented Sept. 21, 1915.

Application filed March 4, 1915. Serial No. 12,04...

*To all whom it may concern:*

Be it known that I, PEARL DANIELL, a citizen of the United States, residing at Lawton, in the county of Comanche and State of Oklahoma, have invented certain new and useful Improvements in Brooders; and I do declare the following to be a full, clear, and exact description of the invention, such as will enable others skilled in the art to which it appertains to make and use the same.

This invention relates to improvements in brooders and has for its object to provide an efficient artificial substitute for the mother hen for the brooding of young chicks in which a uniform heat centrally applied is radiated downward upon the backs of the chicks, keeping their bodies warmer than their feet and legs.

Another object is to provide a brooding chamber which is free from corners wherein the chicks might be injured from crowding, and which is readily accessible for cleansing and which is evenly heated and ventilated and provided with conveniently accessible means for permitting the chicks to pass in and out.

Another object is to provide improved means for guiding the hood which is adapted to be raised and lowered for admitting more or less air to the brooder chamber and to permit access thereto for cleaning.

Another object is to provide improved means for covering the chicks in the form of a blanket hover having means for detachably mounting it within the brooding chamber.

With these and other objects in view, the invention consists of certain novel features of construction, and the combination and arrangement of parts as will be hereinafter more fully described and claimed.

In the accompanying drawings: Figure 1 represents a side elevation of this improved brooder with the hood in lowered position; Fig. 2 represents a similar view with the hood raised; Fig. 3 is a central vertical section thereof with the hood shown lowered; Fig. 4 is a horizontal section taken on line 4—4 of Fig. 1; Fig. 5 is a similar view taken on line 5—5 of Fig. 1; and, Fig. 6 is a side elevation of a slightly different form of the invention.

In the embodiment illustrated a supporting base plate 1 is shown circular in form and having an upright peripheral wall 2 rising therefrom and preferably constructed of wire mesh but which may be of any suitable material. This wall 2 has an opening 3 therein which is provided with a closure 4 hinged at its lower edge to the periphery of the plate 1 and which is designed when open to form a porch or runway leading from the plate 1 to the ground and when swung upward into closed position forms a closure for the opening in said wall, said member 4 being provided with a suitable latch 5 for holding it in closed position. This base plate 1 is preferably mounted on rollers or casters 6 to facilitate its removal from place to place, without necessitating any lifting thereof.

An upright circular wall 7 rises from the upper face of the base plate 1 at points spaced inwardly from the wall 2 and is arranged concentric therewith to form a brooder chamber 8. This wall 7 has an opening 9 therein disposed at a point opposite the opening 3 in the wall 2 to permit the chicks to pass into and out of said brooder chamber into the runway or exercising yard formed between said walls 2 and 7.

A lamp socket 10 is shown disposed centrally in the chamber 8 and is adapted to receive a lamp 11 which is removably supported in said socket, being here shown provided with an annular flange 12 which is designed to rest on the upper edge of said socket when said lamp is in operative position. A hover blanket 13 is here shown in circular form and of greater diameter than the diameter of the brooding chamber and is provided at its edge with a ring 14 which is adapted to fit over and engage the upper edge of the wall 7 for holding said hover in engagement with said wall, and the center of said blanket is disposed in this socket 10 and is held therein by placing the lamp 11 thereover, said blanket being preferably apertured at its center to permit the lamp to pass therethrough and yet bindingly secure it in connection with the socket. When so mounted the blanket or hover 13, being of greater diameter than the diameter of the brooding chamber, said blanket will depend into said brooding chamber and form a hover like a mother hen for resting on the backs of the chicks and thus assisting in keeping them warm. As shown this hover is provided in its edge with a recess 15 which is adapted to be arranged over the opening 9 in the wall 7 so as to leave said opening 9 always open to enable the chicks to pass readily in and out of the brooding chamber.

In Figs. 1 to 5 four standards 16 are shown projecting upwardly from the base plate 1 in the space between the walls 2 and 7 and which are preferably arranged equal distances apart and which preferably converge toward their upper ends and are here shown in the form of inverted U-shaped bails, the cross bars of which intersect, and the legs of which are engaged with the plate 1. These standards are designed to form supporting guides for a hood 17 to be described. A pulley 18 is mounted at the intersection of the cross bars of the standards and is adapted to receive a flexible element 19 which is connected with the top of the hood 17 connected at one end with the top of the hood for raising and lowering said hood when desired.

The hood 17 is herein shown in the form of a cylinder having a cone shaped top 20 mounted on the upper end thereof with its peripheral edge overhanging the upper edge of the cylinder and forming an eave-like projection 21 which is provided with a plurality of equally spaced apertures 22 which are positioned to slidably engage the standards 16 so that said hood when raised or lowered will be held against lateral movement and thus provide for its proper seating relative to the brooder chamber. The cylindrical portion or body of this hood 17 is of slightly greater diameter than the diameter of the wall 7 and is designed to fit loosely over said wall when in lowered operative position. This hood body is provided at its lower edge with an opening 23 which is adapted to register with the opening 9 in the wall 7 to provide for the ingress and egress of the chicks when the hood is in lowered position. A closure 24 is preferably provided for this opening 23 and may be hinged either to the upper edge thereof or to one side as may be desired.

Disposed within the cone shaped top 20 of the hood is a similarly shaped deflector 25 which depends from said top 20 and is spaced therefrom by means of suitable brackets 26 said deflector being smaller than said top to provide ample space between it and the inner face of the top for the passage therearound of the products of combustion from the lamp and the impure heated air which is designed to pass out through a pipe 27 mounted in an opening formed near the apex of the hood top 20. This hood 17 is also provided with a plurality of apertures 28 to provide proper ventilation for the brooding chamber when said hood is in a lowered position.

The deflector 25 which is disposed in the top of the hood is designed to deflect the heat from the lamp 11 downwardly onto the backs of the chicks and thus conserve all the heat possible and prevent its escape to the atmosphere without having first accomplished its purpose. By mounting this hood on the pulley 18 it may be readily raised and lowered to open the brooder chamber when necessary or desirable to permit fresh air to pass therein or for cleaning purposes and on sunny days the brooder may be rolled out into the sun light and said hood raised high enough to permit the sun to shine down into the brooder. By arranging the walls 2 and 7 a suitable distance apart, a runway or exercising yard is provided for the chicks and both the brooder chamber and the yard are preferably lined with heavy paper to prevent the brooder from becoming soiled and to assist in keeping the feet of the chicks warm. By disposing the lamp socket centrally in the brooder chamber the chicks are prevented from crowding close together at the center of the chamber, which frequently results in smothering of some of the chicks.

In the form shown in Fig. 6 the hood 17 is mounted on a single bracket which is shown in the form of an L-shaped standard 29, the short arm 30 of which projects over the brooder chamber at a point spaced thereabove a considerable distance and on which is mounted a pulley 18'. This standard is preferably revolubly mounted in the plate 1 to provide for its being swung around to position the hood out of alinement with the brooder chamber to afford access thereto for cleaning or airing purposes. This form of support for the hood is desirable for the reason above set forth but the form shown in the other figures is preferred in that the standards there shown provide guides for the hood and hold it against lateral movement thereby insuring its proper seating over the wall 7 of the brooder chamber when lowered.

I claim as my invention:

1. A brooder comprising a base plate, concentric annular walls rising from said plate and spaced apart forming a brooder chamber and a runway, said walls having openings therein for the passage of the chicks, a lamp support mounted centrally within the brooder chamber, a hover blanket connected with said lamp support and engaged with the inner upright wall, said blanket depending into said chamber, and a vertically movable hood mounted over said hover chamber.

2. A brooder comprising a base plate, concentric annular walls rising from said plate and spaced apart forming a brooder chamber and a runway, said walls having openings therein for the passage of the chicks, a lamp support mounted centrally within the brooder chamber, a hover blanket connected with said lamp support and engaged with the inner upright wall, said blanket depending into said chamber, a vertically movable hood mounted over said hover chamber, a hood having a cone shaped top with openings therein, and a cone shaped deflector depending from the top of said hood and of smaller diameter.

3. A brooder comprising a circular base plate, annular upright walls mounted on said base plate and spaced laterally from each other, said walls having openings therein, a lamp socket disposed centrally on said base plate within the inner wall, a hover blanket engaged at its center with said lamp socket and provided at its outer edge with an annular member adapted to engage the upper edge of said inner wall, said blanket being of greater diameter than the diameter of said inner wall, standards rising from said base plate outside of said inner wall and converging toward their upper ends, a pulley supported by the converging ends of said standards, a hood slidably engaged with said standards, and a flexible element connected with said hood and passing over said pulley.

4. A brooder comprising a base plate mounted on rollers, annular concentric walls rising from said base plate and spaced from each other, said inner wall having an opening therein, a standard rising from said base plate, a hood supported by and mounted for vertical movement on said standard, a cone shaped deflector depending from the top of said hood and heating means mounted within said inner wall.

5. A brooder comprising a base plate, an upright wall rising therefrom and having an opening therein, inverted U-shaped standards having the free ends of their legs secured to said base plate and their cross bars intersecting each other at a point above said wall, a hood slidably mounted on said standards, and means for raising and lowering said hood.

In testimony whereof I have hereunto set my hand in presence of two subscribing witnesses.

PEARL DANIELL.

Witnesses:
  A. G. SECHRIST,
  J. D. DANIELL.